US008787564B2

(12) United States Patent
Brown (10) Patent No.: US 8,787,564 B2
(45) Date of Patent: Jul. 22, 2014

(54) ASSESSING CRYPTOGRAPHIC ENTROPY

(75) Inventor: Daniel Richard L. Brown, Mississauga (CA)

(73) Assignee: Certicom Corp., Mississauga, Ontario (CA)

( * ) Notice: Subject to any disclaimer, the term of this patent is extended or adjusted under 35 U.S.C. 154(b) by 29 days.

(21) Appl. No.: 13/307,078

(22) Filed: Nov. 30, 2011

(65) Prior Publication Data

US 2013/0136255 A1    May 30, 2013

(51) Int. Cl.
*H04K 1/00* (2006.01)
*H04L 9/00* (2006.01)

(52) U.S. Cl.
USPC ............ 380/28; 380/44; 380/45; 380/46; 380/47

(58) Field of Classification Search
USPC ............................. 380/44–47, 28
See application file for complete search history.

(56) References Cited

U.S. PATENT DOCUMENTS

| | | | |
|---|---|---|---|
| 2006/0067527 | A1 | 3/2006 | Urivskiy et al. |
| 2008/0091975 | A1* | 4/2008 | Kladko et al. ............ 714/25 |
| 2010/0002877 | A1* | 1/2010 | Zhang .................... 380/46 |
| 2010/0106756 | A1* | 4/2010 | Ellison ................... 708/212 |
| 2010/0106757 | A1 | 4/2010 | Matthews et al. |
| 2010/0111296 | A1 | 5/2010 | Brown et al. |
| 2010/0153728 | A1 | 6/2010 | Brown |
| 2011/0060909 | A1 | 3/2011 | Brown et al. |
| 2011/0208970 | A1 | 8/2011 | Brown et al. |
| 2011/0213982 | A1 | 9/2011 | Brown |
| 2011/0268270 | A1 | 11/2011 | Vanstone et al. |

OTHER PUBLICATIONS

Xinjie Guan; Xili Wan; Junzhou Luo, "A Maximum Entropy Based Multi-dimensional Trust Model," Network and Parallel Computing, 2008. NPC 2008. IFIP International Conference on , vol., no., pp. 226,232, Oct. 18-21, 2008 doi: 10.1109/NPC.2008.54*
Teixeira, A.; Souto, A.; Matos, A.; Antunes, L., "Entropy measures vs. algorithmic information," Information Theory Proceedings (ISIT), 2010 IEEE International Symposium on , vol., no., pp. 1413,1417, Jun. 13-18, 2010 doi: 10.1109/ISIT.2010.5513643.*
Brown, Daniel R.L.: "Formally Assessing Cryptography Entropy", document dated Oct. 20, 2011; 92 pages. (Internet URL: http://eprint.iacr.org/eprint-bin/getfile.pl?entry=2011/659&version=20111209:210029&file=659.pdf) and "Cryptology ePrint Archive: Report 2011/659" (1 page).
Kelsey et al. "Yarrow—160: Notes on the Design and Analysis of the Yarrow Cryptographic Pseudorandom Number Generator", Selected Areas in Cryptography. Annual International Workshop, XP001012490; Aug. 1999, pp. 13-33.
Rukhin, Andrew et al.: "A Statistical Test Suite for Random and Pseudorandom Number Generators for Cryptographic Applications", May 15, 2001, XP55026647; 162 pages.

(Continued)

*Primary Examiner* — Evans Desrosiers
*Assistant Examiner* — Vu V Tran
(74) *Attorney, Agent, or Firm* — Fish & Richardson P.C.

(57) ABSTRACT

Systems, methods, software, and combinations thereof for evaluating entropy in a cryptography system are described. In some aspects, sample values are produced by an entropy source system. A typicality can be determined for each of the sample values. A grading is determined for preselected distributions based on the typicalities of the sample values. A subset of the preselected distributions are selected based on the gradings. An entropy of the entropy source system is calculated based on the subset of the plurality of distributions.

16 Claims, 2 Drawing Sheets

(56) References Cited

OTHER PUBLICATIONS

International Search Report and Written Opinion issued in International Application No. PCT/CA2012/050672 dated Dec. 20, 2012; 9 pages.
Extended European Search Report issued in EP Application No. 11191302.6 dated May 18, 2012; 8 pages.
ANSI, Draft ANS X9.82: Part 2—2007, Random Number Generation Part 2: Entropy Sources, dated Dec. 2007, 90 pages.
ANSI, Draft ANS X9.82: Part 2—2004, Random Number Generation Part 2: Entropy Sources, dated 2004, 44 pages.
ANSI, Draft ANS X9.82: Part 2—2007, Random Number Generation Part 2: Entropy Sources, dated Sep. 2007, 90 pages.
National Institute of Standards and Technology. Security Requirements for Cryptographic Modules, Federal Information Processing Standard (FIPS) 140-1, Jan. 1994, 42 pages.
E. Barker and J. Kelsey. Recommendation for Random Number Generation Using Deterministic Bit Generators, Special Publication 800-90. National Institute of Standards and Technology, Mar. 2007, 133 pages.
D. R. L. Brown and K. Gjosteen. A security analysis of the NIST SP 800-90 elliptic curve random number generator. In A. J. Menezes (ed.), Advances in Cryptology—CRYPTO 2007, Lecture Notes in Computer Science 4622, pp. 466-481. Springer, Aug. 2007.
B. Barak and S. Halevi. A model and architecture for pseudo-random generation with applications to /dev/random. In C. Meadows (ed.), Proceedings of the 12th ACM conference on Computer and communications security, pp. 203-212. ACM, Nov. 2005.
M. Baudet, D. Lubicz, J. Micolod and A. Tassiaux. On the security of oscillator-based random number generators. J. of Cryptology, 24(2):398-425, Oct. 2010.
L. E. Baum, T. Petrie, G. Soules and N. Weiss. A maximization technique occurring in the statistical analysis of probabilistic functions of markov chains. The Annals of Mathematical Statistics, 41(1):164-171, 1970.
C. Cachin. Smooth entropy and R'enyi entropy. In W. Fumy (ed.), Advances in Cryptology—EUROCRYPT '97, Lecture Notes in Computer Science 1233, pp. 193-208. Springer, May 1997.
E. K. P. Chong and S. H. Zak. An Introduction to Optimization. Wiley, 1996, 417 pages.
I. P. Goulden and D. M. Jackson. Combinatorial Enumeration. Wiley, 1983, 594 pages.
T. Jennewein, U. Achleitner, G. Weihs, H. Weinfurter and A. Zeilinger. A fast and compact quantum random number generator. Review of Scientific Instruments, 71(4):1675-1680, 2000.
A. Juels, M. Jakobsson, E. Shrver and B. K. Hillyer. How to turn loaded dice into fair coins. IEEE Transactions on Information Theory, pp. 911-921, 2000.
M. Luby. Pseudorandomness and Cryptographic Applications. Princeton University Press, 1996, 247 pages.
I. G. Macdonald. Symmetric Functions and Hall Polynomials. Oxford University Press, second edn., 1995, 487 pages.
U. Maurer. A universal statistical test for random bit generators. In A. J. Menezes and S. A. Vanstone (eds.), Advances in Cryptology—CRYPTO '90, Lecture Notes in Computer Science 537, pp. 409-420. 1991.
A. J. Menezes, P. C. van Oorschot and S. A. Vanstone. Handbook of Applied Cryptography, Chapter 2: Mathematical Background, CRC Press, 1997, 39 pages.
A. J. Menezes, P. C. van Oorschot and S. A. Vanstone. Handbook of Applied Cryptography, Chapter 5: Pseudorandom Bits and Sequences, CRC Press, 1997, 23 pages.
A. J. Menezes, P. C. van Oorschot and S. A. Vanstone. Handbook of Applied Cryptography, Chapter 8: Public Key Encryption, CRC Press, 1997, 38 pages.
A. R'enyi. On measures of entropy and information. In Proceedings of the 4th Symposium on Mathematics, Statistics and Probability, pp. 547-561. 1960.
C. P. Schnorr. Small generic hardcore subsets for the discrete logarithm: Short secret DL-keys. Information Processing Letters, 79: pp. 93-98, 2001.
B. Sunar, W. J. Martin and D. R. Stinson. A provably secure true random number generator with built-in tolerance to active attacks, dated Jun. 2005, 19 pages.
B. Jun and P. Kocher, The Intel Random Number Generator, Cryptography Research, Inc. White Paper, Apr. 22, 1999, 8 pages.
D. Auckly, Solving the Quartic with a Pencil, arXiv:math/0310449v2, dated Jan. 26, 2007, 15 pages.
L. R. Welch, Hidden Markov Models and the Baum-Welch Algorithm, IEEE Information Theory Society Newletter, vol. 53, No. 4, Dec. 2003, 24 pages.

\* cited by examiner

ASSESSING CRYPTOGRAPHIC ENTROPY

BACKGROUND

This specification relates to assessing entropy in a cryptography system. Cryptography systems enable secure communication over public channels. For example, in public-key cryptography systems, a message sender encrypts a plaintext message using an encryption algorithm, and transmits the encrypted message to a recipient. The recipient can use a secret key value to recover the plaintext message from the encrypted message. In some cryptography systems, the entropy of the secret key value makes the cryptography system robust against certain types of attacks.

DETAILED DESCRIPTION

A cryptography system can generate and utilize cryptographic secrets (e.g., secret key values, passwords, etc.). In some instances, cryptographic secrets can include entropy from an entropy source. For example, a pseudorandom number generator that generates cryptographic secrets can be seeded by a value that is random, from an adversary's perspective, to protect against certain types of attacks by the adversary. Entropy can be used in a combination of these and other ways to decrease the effectiveness or efficiency of sophisticated adversarial attacks.

This disclosure describes several forms of entropy appropriate for use in cryptography systems. This disclosure also describes statistical inference techniques appropriate for assessing entropy in cryptography systems. For example, cryptographic keys include entropy to avoid being guessed by adversaries. The entropy gathered for the keys can be assessed, for example, so that estimation for risks of attacks can be reliably performed. The present disclosure describes example entropy sources that can be used for some cryptography systems. The present disclosure also describes some example assumptions about the probabilities characterizing the entropy sources. In some aspects of the present disclosure, a conservative estimate of the amount of entropy is produced by using statistical inferences.

Multiple types of entropy assessments can be made. In some instances, e.g., to generate a conservative assessment, the minimum of the assessments can be taken as the total or actual assessment. The entropy can be assessed based on sample values obtained directly from an entropy source. In some instances, entropy measurements based on values obtained from the entropy source provide a more accurate or more useful assessment than other types of measurements, such as, for example, entropy measurements based on the output of a cryptographic operation. Some cryptographic operations, such as hash functions and block ciphers, can be generally designed to produce outputs which appear uniformly distributed even if the inputs are non-uniform. An inference method that does not specifically account for the cryptographic operations can potentially, in some instances, yield an assessed entropy exceeding the actual entropy. In such instances, the task of entropy assessment can potentially be obscured or even undermined. In some implementations, entropy assessments that account for cryptographic operations may be used.

Figure 1:
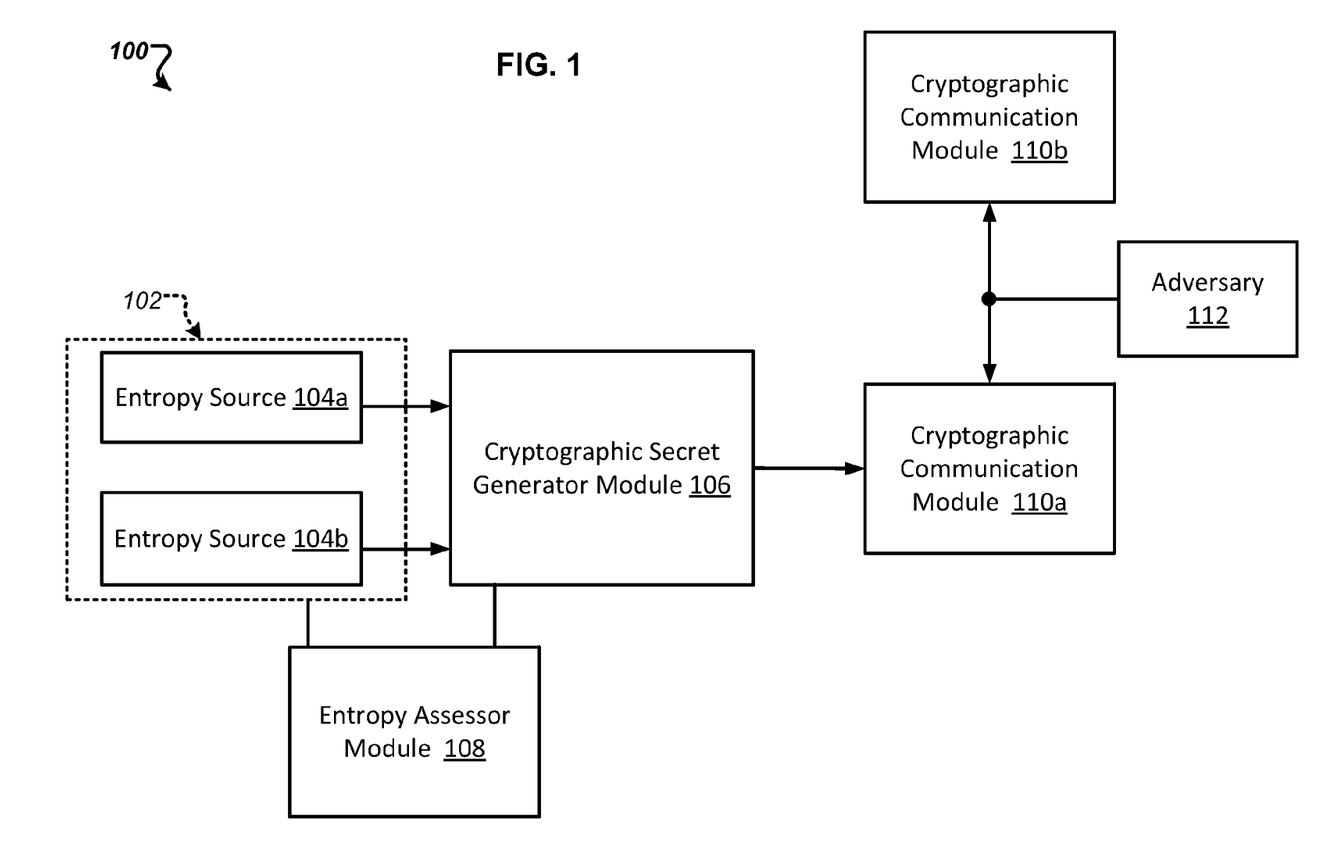
FIG. 1 is a schematic diagram of an example cryptography system.

FIG. 1 is a schematic diagram of an example cryptography system 100. The example cryptography system 100 includes an entropy source system 102, a cryptographic secret generator module 106, an entropy assessor module 108, and a cryptographic communication module 110a. In some instances, as in the example shown in FIG. 1, the cryptography system 100 includes additional cryptographic communication modules (e.g., the cryptographic communication module 110b, and possibly more) and an adversary 112. The cryptography system 100 can include additional or different features and components, and the cryptography system 100 may be configured as shown and described with respect to FIG. 1 or in a different manner.

In one example aspect of operation, the entropy source system 102 provides output values to the cryptographic secret generator module 106. The output values provided by the entropy source system 102 can serve as a source of entropy for the cryptographic secret generator module 106. For example, the cryptographic secret generator module 106 can be a pseudorandom number generator module that is seeded by the output values from the entropy source system 102. The cryptographic secret generator module 106 produces a cryptographic secret (e.g., a private key) and provides the cryptographic secret to the cryptographic communication module 110a. The cryptographic communication module 110a communicates with other entities in the cryptography system 100 based on the cryptographic secret. For example, the cryptographic communication module 110a may produce encrypted messages, digital signatures, digital certificates, cryptographic keys (e.g., public and private keys, ephemeral and long-term keys, etc.), or a combination of these and other types of cryptographic data based on the secret key provided by the cryptographic secret generator module 106. The secret value provided by the cryptographic secret generator module 106 can be used as, or can be used to produce, a cryptographic key for cryptographic communications.

In some aspects of operation, the entropy assessor module 108 assesses the entropy of output values produced by the entropy source system 102. For example, the entropy assessor module 108 can obtain sample output values from the entropy source system and assess the entropy of the entropy source system 102 from the perspective of the example adversary 112, or from another perspective. In some cases, the entropy assessor module 108 uses one or more of the techniques described below. The entropy assessor module 108 may evaluate the entropy, for example, in connection with manufacturing the entropy source system 102, the cryptographic secret generator module 106 or any combination of these and other components of the cryptography system 100. The entropy assessor module 108 may evaluate the entropy, for example, in connection with deploying or testing aspects or components of the cryptography system 100, during use of a cryptography system 100, or in other instances. In some implementations, the entropy assessor module 108 evaluates the entropy of the entropy source system 102 when the entropy source system 102 is instructed to provide output values for the cryptographic secret generator module 106.

The components of the example cryptography system 100 shown in FIG. 1 can be implemented in any suitable combination of hardware, software, firmware, or combinations thereof. In some instances, the entropy source system 102, the cryptographic secret generator module 106, the entropy assessor module 108, and the cryptographic communication module 110a can be implemented as software modules that are executed by one or more general purpose processors. In some instances, one or more of the entropy source system 102, the cryptographic secret generator module 106, the entropy assessor module 108, or the cryptographic communication module 110a can be implemented as one or more hardware components. The hardware components may include specialized processors or pre-programmed logic, general purpose processors executing software, or other types of data processing apparatus.

The cryptographic secret generator module 106 produces an output based on values provided from the entropy source system 102. For example, the cryptographic secret generator module 106 can include a pseudorandom number generator or another type of system or process. A pseudorandom number generator can be implemented in hardware, software, firmware, or any combination thereof. A pseudorandom number generator can operate deterministically and provide an output that appears random from the adversary's perspective. Accordingly, the output of a pseudorandom number generator can be referred to as a random output value although the pseudorandom number generator itself operates deterministically. In some implementations, the output value obtained from a pseudorandom number generator depends on the state of the pseudorandom number generator. For example, the pseudorandom number generator may define multiple different states that each correspond to a different output values. The state can be updated, for example, by progressing to a subsequent state, each time the pseudorandom number generator provides an output value. The state can be refreshed (or reseeded), for example, to add entropy to the state periodically or upon specified conditions.

The cryptographic communication module 110a can include any suitable hardware, software, firmware, or combinations thereof, operable to execute cryptographic operations. In some instances, the cryptographic communication module 110a is configured to perform data encryption. For example, the cryptographic communication module 110a may be configured to encrypt messages or other types of data based on a secret key provided by the cryptographic secret generator module 106. In some instances, the cryptographic communication module 110a is configured to provide data authentication. For example, the cryptographic communication module 110a may be configured to generate a digital signature or authentication tag based on a secret key provided by the cryptographic secret generator module 106. In some instances, the cryptographic communication module 110a is configured to generate digital certificates or other types of cryptographic objects. For example, the cryptographic communication module 110a may be configured as a certificate authority to issue digital certificates based on a secret key provided by the cryptographic secret generator module 106. The cryptographic communication module 110a may be configured to perform additional or different types of operations.

In some implementations, the cryptographic communication modules 110a and 110b can communicate with each other over an open channel. For example, the cryptographic communication module 110a may send cryptographic data (e.g., encrypted messages, signed messages, cryptographic certificates, public keys, key-agreement data, etc.) to the cryptographic communication module 110b over a communication channel that is observable, partially or wholly, by the adversary 112. In some instances, the cryptographic communication modules 110a and 110b can communicate over one or more data communication networks, over wireless or wired communication links, or other types of communication channels. A communication network may include, for example, a cellular network, a telecommunications network, an enterprise network, an application-specific public network, a Local Area Network (LAN), a Wide Area Network (WAN), a private network, a public network (such as the Internet), a WiFi network, a network that includes a satellite link, or another type of data communication network. Communication links may include wired or contact-based communication links, short-range wireless communication links (e.g., BLUETOOTH®, optical, NFC, etc.), or any suitable combination of these and other types of links.

The entropy source system 102 can include one or more entropy sources. For example, as illustrated in FIG. 1, the entropy source system 102 includes two entropy sources 104a and 104b ("entropy sources 104a-b"). In some instances, entropy sources can be modified or added to the entropy source system 102 as needed, for example, to achieve sufficient entropy. The entropy sources 104a-b can provide information that has entropy. For example, the entropy sources 104a-b can include a ring oscillator, a noisy diode, mouse movements, variances in disk read time, system process usages, or other quantifiable but unpredictable phenomena or behaviors. In some implementations, the entropy sources 104a-b generate a collection of samples (e.g., logged signal, measurement history, saved variation) that are accumulated into an entropy pool by using a deterministic process. For example, the entropy pool can be a concatenation of all the samples values. Compression may be applied to the concatenation on account of memory restrictions. The compression process may be a group addition, a cryptographic hash function, a random extraction, or any other appropriate compression method.

The cryptographic secret generator module 106 may use the entropy pool of the entropy sources 104a-b to generate the cryptographic secret (i.e., keys). For example, a seed can be extracted from the entropy pool for the secret generation. The cryptographic secret generator module 106 can be operated as a well-seeded and well-designed deterministic pseudorandom number generator to generate random numbers as the keys. The initial seed can provide the cryptographic entropy to the number generated. In some instances, the random numbers generated by the cryptographic secret generator module 106 can appear as indistinguishable from uniformly distributed random numbers. The cryptographic secret generator module 106 may employ backtracking resistance and other techniques. For example, output values can be generated by a pseudorandom number generator in a manner that avoids the output values feasibly being used to recover the internal state of the pseudorandom number generator, and avoids the output values feasibly being used together with the internal state of the pseudorandom number generator to determine past internal states. In some implementations, the backtracking resistance of the cryptographic secret generator module 106 can provide forward secrecy of key agreement schemes.

The processing of the samples from the entropy sources 104a-b to the cryptographic secret generator module 106, can be deterministic and without additional entropy. The deterministic algorithms in a cryptography system may not be kept sufficiently secret, or it may be unrealistic in some instances to assess the entropy of an algorithm. For example, if the adversary does not know the algorithm, it may be unrealistic in some instances to measure or quantify the information that is unknown to the adversary as a result of the adversary not knowing the algorithm. The entropy sources 104a-b may behave according to a probability distribution that can be used to assess the entropy sources 104a-b. This probability distribution may be less than exactly defined, but can be assumed to at least belong to some known set of probability distributions. Under such assumption, statistical inferences can be applied to assess the cryptographic entropy provided by the entropy sources 104a-b, and/or other entropy sources in general.

In some implementations, the entropy sources 104a-b include or access processes of an operating system (e.g. the operating system of a computing device). In some implementations, for software to have an entropy source, one common practice is to examine the set of processes running on a computer on which the software is installed. In some example operating systems where multiple processes are sharing processor time, the list of processes with amount of processor time each has used, may have some entropy. For example, some processes may need to write to a hard disk. When writing to a hard disk, the disk-seek-time is known to vary depending on where data is located on the hard disk and other factors. An advantage of such entropy sources is that special hardware or user actions are not required for the entropy source.

In some implementations, the entropy sources 104a-b include or access environmental conditions. For example, some systems have inputs which can be used as an entropy source, such as a microphone for monitoring the sound in the local environment. The audio recording may be a combination of noises and ambient activities that cannot be predicted. An advantage of such an entropy source is that the entropy source may not require user actions or special or additional hardware (e.g., because microphones, video cameras, and other computer peripheral hardware are commonly available). A possible disadvantage is any adversary close enough may also have partial access to the entropy source. For example, the adversary 112 may place a microphone in the same environment to record the sound of the same ambient activities.

In some implementations, the entropy sources 104a-b include or access user inputs. In some systems, users often supply inputs, such as, for example, mouse movements, keyboard strokes, touchpad gestures, etc. These inputs may be used as the entropy sources 104a-b. The inputs used for entropy may be gathered incidentally through normal use or through a procedure where the user is requested to enter inputs with the instruction to produce something random. In addition to treating user inputs as an entropy source from which entropy can be extracted to derive a secret cryptographic key, a system can rely on the user to directly provide a secret value, for example, in form of a user-selected password. The user-selected passwords may require entropy. Thus, the entropy of user-selected passwords can be assessed. In some implementations, system-generated passwords can also be used as the secret value. The system-generated passwords can apply a deterministic function to the output of random number generator. The deterministic function renders the random value in a more user-friendly format, such as alphanumeric. The result is a password that may need entropy, and the source of entropy may be some other entropy source. Thus, the entropy of the password can be assessed.

In some implementations, the entropy sources 104a-b may include or access coin flipping. In some examples, the coin flipping entropy source may be realized as follows. A coin is thrown by a person into the air, with some rotation about an axis passing nearly through a diameter of the coin. The coin is either allowed to land on some surface or to be caught by hand. A result is either heads or tails, determined by which side of the flipped coin is facing up. Coin flips are often modeled such that each result is independent of all previous results. Furthermore, for a typical coin, it is often modeled that heads and tails are equally likely. A sequence of coin flips can be converted to a bit string by converting each result of head to a 1 and each tail to 0. In such a simple model, the resulting bit string is uniformly distributed among all bit strings of the given length.

In some implementations, more skeptical and/or sophisticated models of the coin flipping can be formulated as follows. Firstly, it may be noted that a dishonest coin flipper could potentially cheat in certain ways. For example, the cheater may not rotate the coin on the correct axis, but rather an axis at a 45 degree to the plane of the coin. This may cause the coin to appear to rotate, but maintain one side closest to a particular direction in space. For another example, a cheater, with juggling skills, may be able to toss the coin with a given speed and rotation (of proper type) such that either the coin can be caught with an intended side up, or perhaps land on a surface with higher probability of landing on an intended side. If one considers that cheating is possible, then consider that an honest coin flipper may inadvertently introduce bias in the coin flips. Indeed, in a cryptographic application relying only on coin flips for entropy, a user may need to flip a coin at least 128 times. As the user then becomes tired of repeated flips, the user may start to become repetitive and perhaps suffer from such bias. To account for this, one could formulate a more pessimistic probability model for the coin flippers, and then do some statistical analysis comparing the pessimistic model with the actual sample of coin flips.

In some implementations, the entropy sources 104a-b may include or access one or more dice. Dice, or cubes with numbers on the sides, can be used in games of chance. Provided that adequate procedures are used in the rolling, the number that ends up at the top of the die, when its motion has ceased, is believed to at least be independent of previous events. On the one hand, the roll of a die seems to be governed mainly by deterministic laws of mechanics once it is released, so it may seem that all the randomness is supplied by the hand that rolled the die. On the other hand, it may be apparent that the rollers of dice cannot control the results of the dice rolls, and in particular the source of the randomness is the actual rolling process. This discrepancy can be explained as follows.

Each collision of the die with the ground causes it to bounce. Because the die is tumbling as it bounces, some of the rotational energy of the die may be converted into translational energy of the die, and vice versa. This conversion depends very much on the orientation of the die as it impacts the surface upon which it rolls. With each bounce, the resulting translational energy affects the amount of time before the next bounce. The amount of time between bounces affects the amount of rotation of the die, and therefore its orientation. This may mean that a small difference in orientations at one bounce results in a large difference in orientations at the next bounce.

The behavior of a rolling die may be similar to the butterfly effect, because each bounce magnifies the effect of the orientation and rotation, and the outcome of the die roll, as determined by the final orientation of the die depends on the fine details in the initial orientation and motion of die. Such a process is known as chaotic. Although technically deterministic, physical chaotic processes are difficult to predict, partly because it is impractical to obtain the necessary precision on the initial conditions to determine the final condition. Therefore, rolling dice can be a practical way to seed a random number generator that can be used to generate organizational level secret keys. Rolling dice may be impractical for some types of user-level secret keys, for example, where rolling dice is infeasible for runtime sources of entropy.

In some implementations, the entropy sources 104a-b may include or access a ring oscillator, which has been a common source for entropy. Ring oscillators can be implemented as odd cycles of delayed not-gates. Whereas even cycles of delayed not gates can be used for memory storage, ring oscillators tend to oscillate between 0 and 1 (low and high voltage) at a rate proportional to the number of gates in the oscillator. Since the average oscillation rate can be calculated from the number of gates and general environmental factors, such as temperature, the variations in the oscillation may be regarded as the entropy source. Ring oscillators are not available in some general purpose computer systems, but they can be included in other types of hardware (e.g., custom systems, field programmable gate arrays (FPGA), etc).

In some implementations, the entropy sources 104*a-b* may include or access a radioactive decay. Some smoke detectors use the radioactive element americium which emits alpha particles. The same method may be used as a cryptographic entropy source, such as for the generation of organization-level secret keys.

In some implementations, the entropy sources 104*a-b* may include a hypothetical muon measurer. A muon measurer can provide a 32-bit measure of the speed of each muon passing through the device. In some examples, one muon passes through the detector per minute on average. Because of the underlying physics of muons, this entropy source may be viewed as providing a robust entropy source, whose rate of entropy cannot be affected by an adversary.

In some implementations, the entropy sources 104*a-b* may include or access a quantum particle measurement. The theory of quantum mechanics implies that quantum particles, such as photons or electrons, can exist in a superposition of states under which measurement causes a wave function collapse. The theory states that wave function collapse is a fully random process independent of all other events in the universe. Under this theory, an entropy source derived from such wave function collapse would be absolutely unpredictable, which is highly useful for cryptography.

The entropy sources 104*a-b* can be assessed for reliable risk analysis so that the cryptographic secret generator module 106 can produce a secret key useful against adversaries. As an example, unclear responsibility for properly seeding of pseudorandom number generators can result in problems. Suppose a manufacturer of cryptographic software implements a pseudorandom number generator but does not provide a source of entropy. If the manufacturer sets the seed to a default value, and user of the software may mistakenly generate "random" values with the default seed, unwittingly believing that random number generator includes a source of entropy, then the outputs of the pseudorandom number generator may be considered to have zero entropy (e.g., to the adversary who knows the default seed). An assessment of entropy may help to avoid such vulnerabilities.

Formally assessing entropy can, in some instances, prevent or reduce the chances of certain types of failures and vulnerabilities in a cryptography system. For example, if the internal state of a deterministic pseudorandom number generator is somehow revealed to an adversary, then all its future outputs can be determined by the adversary, unless the pseudorandom number generator is refreshed with new entropy. The property obtained by frequent refreshing is sometimes referred to as prediction resistance (where refreshing is sometimes referred to as reseeding), or forward security. The entropy needed for forward security generally can be obtained during deployment in the field. In many cases, entropy in the field may be regarded as scarce. For this reason, entropy assessment is appropriate.

Assessment on the entropy sources 104*a-b* can be performed by the entropy assessor module 108 before deployment, during deployment, or at any appropriate combination of these and other instances. For example, one or more sample values from the entropy sources 104*a-b* can be used to infer something about their distribution. In some cases, the sample values are discarded, and the inferences about the sources are used to assess their ability to generate entropy in the future. This approach provides prospective assessment, performed before deployment. In another case, the sample values can be used for some cryptographic application, such as forming some of the input to the cryptographic secret generator module 106, which derives a secret key. For example, there may be environments or contexts where entropy is believed to be so scarce that it is not affordable to discard the sample values. This approach provides retrospective assessment, performed during deployment. In some situations, retrospective assessment can leak information to an adversary. As such, contingent entropy may need to be assessed, as appropriate.

In some situations, the cryptographic secret generator module 106 may generate keys for multiple uses such that one observation of such usage provides enough information to determine, using unlimited computation, the key which could then be used to compromise the remaining usage of the key. For example, in many forms of public-key cryptography, a public key determines uniquely its corresponding private key. As another example, suppose a typical stream cipher (which attempts to generate a one-time pad from a finite key), such as the Advanced Encryption Standard used in counter mode (AES-CTR), is used once, but on a message, part of which is known to the adversary and part of which is unknown. If the known part of the message has sufficient length then, the adversary, given unlimited computation, could determine the stream cipher key, and then the whole message. By contrast, some cryptographic protocols offer information-theoretic security. These protocols attempt to resist an adversary with unlimited computational power, by impractically requiring a very large cryptographic key, which in many cases can be nearly uniform.

Keys whose continued security relies on computational assumptions may have the property of confirmability. An adversary who has the candidate key can confirm the key's correctness by observing the actual use of key. This means that what one considers as the entropy of key needs to account for an adversary who can exhaustively search for keys. Some types of computational-security keys, such as public keys, are such that purely computational attacks are strictly faster than exhaustive search of all possible values of the keys. For example, discrete logarithm keys, such as those used in Diffie-Hellman key agreement or El Gamal signatures, keys may be positive integers less than some prime q. Algorithms, such as Pollard's rho algorithm, can compute the private key about $\sqrt{q}$ steps. Schnorr gives strong evidence that if the private key is chosen from a random set of size $\sqrt{q}$, which allows for exhaustive search of $\sqrt{q}$ steps, no significant improvement of generic algorithms, such as Pollard rho, is any faster than about $\sqrt{q}$ steps. As such, some discrete logarithm private keys may require about half as much entropy as the bit length.

Other types of computational-security keys, such as symmetric encryption keys, are such that currently-known computational attacks have cost similar to exhaustive search. For example, consider the block cipher Advance Encryption Standard (AES), with a key size of 128 bits. Attacks on the use of block cipher exhaustively search each possible key. Accordingly, AES-128 is generally considered to provide 128 bits of security. But providing 128 bits of security seems to require the key be perfectly uniform, meaning it has 128, or almost 128, bits of entropy. Such considerations provide incentive to generate uniform keys. Creating a nearly uniform distribution from biased entropy obtained from actual sources in environments where entropy is scarce may be too expensive in some contexts. Nevertheless, suppose that AES-128 was used with keys having only 100 bits of entropy. Presumably, then only 100 bits of security would be provided. Some chance exists that such keys could be weak. But this would seem unlikely if the keys were selected pseudorandomly, such as by the output of a hash. If 100 bits of security provide adequate protection, then the burden of producing a uniform key is lifted, and one can concentrate on providing adequate entropy.

The entropy assessor module 108 can be used by third parties or other types of entities. In some situations, when a first party supplies a cryptographic product to a second party, the second party values a third party evaluation of the cryptographic product. Third party evaluations of entropy can have some difficulties. For example, proper entropy assessment requires direct access to the sources, which normally, may be not available in the cryptographic product. The first party has an incentive to supply the output of a deterministic pseudorandom number generator as the claimed source. To a third-party evaluator, the effect of this would be the source appears to adhere to a uniform distribution.

The entropy assessor module 108 can be used within an organization or another type of secure infrastructure. In some situations, an organization may provide its members secret keys for encryption purposes, but retain a backup copy of the secret keys. The organization may use a deterministic pseudorandom number generator to generate secret keys for members. The organization may need to be sure about the security of the secret keys, and would likely invest considerable resources into using sufficient entropy for the seed. Some cryptographic applications, such as personal privacy and non-repudiation, require that a user's secret key be truly secret to the user. In this case, some entropy for the user's secret key can be generated on the user's local system.

In some situations, user-defined passwords are values that a user needs to recall and enter into a device, usually to authenticate the user for reasons such as to obtain permission to access certain privileged information. Such passwords are typically too short to contain enough entropy to be used as cryptographic secret key in the sense of being able to render exhaustive search infeasible. This shortness is partially based on the belief that users cannot remember high-entropy passwords. Because of their low entropy, any data value which would allow off-line confirmation of the password guesses, such as the hash of a password, may not be made public. Otherwise a password-dictionary could be applied. Password-authenticated key agreement schemes, such as Simple Password Exponential Key Exchange (SPEKE), are designed to avoid such off-line attacks. The restriction on the exposing user-defined passwords to off-line guessing attacks can apply to both user-selected and system-generated passwords.

In some example aspects of operation, the entropy assessor module 108 can assess whether a cryptographic secret is guessable by the example adversary 112. The entropy assessor module 108 may observe sample output values from the entropy sources 104a-b. The entropy assessor module 108 may rely on a hypothesized probability model for the possible distributions of the entropy sources 104a-b. The probability model can be hypothesized based on theoretical understanding of the entropy sources 104a-b, observations of sample output value from the entropy sources 104a-b, or any suitable combination of these and other information. The entropy assessor module 108 may infer, from the observed sample output values produced by the entropy sources 104a-b, a set of distributions for the entropy sources 104a-b within the hypothesized probability model. The set of distributions can be inferred by considering a grading between sample output values and the distributions. The grading can be based on likelihood, typicality, or a combination of these and others. The set of distributions can be inferred based on maximizing or thresholding the grading from the observed sample values.

In such example aspects of operation, the gradings may be induced from a sample statistic. The sample statistic may include the hypothesized probability model. For example, the sample statistic can be model-neutral or model-invariant. The probability model may be a Markov model. The gradings may be induced from the sample statistic. In some examples, the sample statistic can be the Markov frequency statistic, and the induced probabilities can be computed using the Goulden-Jackson formula. The typicality grading may be determined in terms of a sum of the probabilities of the samples that are less than or equal to the probability of the sample being graded. The typicality grading may be determined in terms of a probability-weighted sum of all over the sample values of an odd function comparing the probability of each sample output value with the probability of the sample being graded. The odd function comparing the sample probabilities can be linear.

In some example aspects of operation, the entropy assessor module 108 may quantify the entropy or unguessability of the entropy sources 104a-b. For example, by the entropy assessor module 108 may quantify the entropy of the entropy sources 104a-b by characterizing the workload of the adversary 112; by determining the possible side channel information leaked to the adversary 112; by considering what function of the sample values will be used in derivation of a cryptographic key; by determining, for each distribution, a value of the conditional applied working entropy of the distribution (e.g., taking the logarithm of the adversary's maximal probability of guessing the cryptographic key); by taking the minimal value of the entropy over the inferred set of distributions; or by any suitable combination of such techniques.

In some example aspects of operation, the entropy assessor module 108 may take steps to ensure that the total entropy of the values used by the cryptographic secret generator module 106 to derive the cryptographic secret is sufficient for a specified level of security. For example, the entropy assessor module 108 may determine from the specified security level, an adequate level of entropy at the given workload characterized for the adversary 112. In some instances, if the assessed entropy is inadequate, then the entropy assessor module 108 may obtain more samples from the entropy sources 104a-b or obtain more entropy sources, and reassess the entropy until the amount of entropy is adequate for the desired security level. In so doing, the entropy assessor module 108 may account for the possibility that the process used to make decisions may leak some portion of this information to the adversary 112. In some instances, a cryptographic key can be derived from samples obtained from the sources.

In such example aspects of operation, assessment of the entropy may be performed prospectively. For example, the sources may be assessed using observed sample values from the source before any key generation is to be done, such as time of development. Assessment may be performed retrospectively in the sense that the sources may be assessed using, in part, sample values that are intended to be used for key generation. The calculated entropy may be eventuated entropy that accounts for the possibility that the samples obtained from the source may have a lower probability, and therefore more entropy, than the most probable outputs of the source.

In some example aspects of operation, the minimization of the entropy with respect to the inferred set of distributions, and the possible maximization of the grading to obtain the inferred set of distributions, may use a generic optimization technique. The generic optimization technique can be, for example, a gradient method, Newton's method, conjugate direction methods, quasi-Newton methods, neural networks, non-differentiating methods, such as Nelder-Mead simplex or simulated annealing, penalty methods, Karush-Kuhn-Tucker conditions, convex methods. The solution to one of the optimization problems involved in the entropy assessment, such as minimization of the entropy over the inferred set of distribution or the determination of the inferred set of distributions as a maximally graded set, may be obtained through an algorithm specific to the hypothesized probability model. For example, if the hypothesized probability model is the hidden Markov model, the Baum-Welch algorithm may be used to solve the optimization problem involved in entropy assessment.

Figure 2:
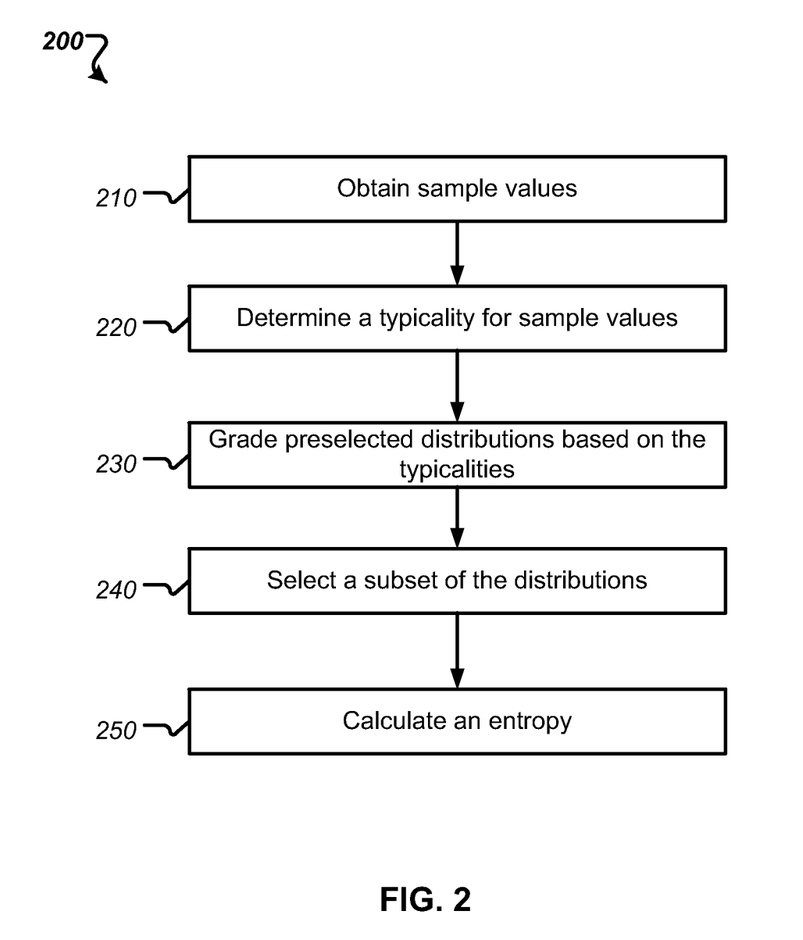
FIG. 2 is an example method for evaluating entropy in a cryptography system.

FIG. 2 is a flow chart showing an example process 200 for calculating entropy in a cryptography system. The example process 200 can be executed by the entropy assessor module 108, for example, to assess the entropy of the entropy sources 104a-b shown in FIG. 1. Each of the entropy sources 104a-b can be assessed individually. The entropy of independent sources can be combined (e.g., added together or combined in another manner). The entropy source system 102 can be assessed as an entropy pool. In some instances, some or all of the operations in the example process 200 can be performed by a computing device, a server, by another type of computing system, or any suitable combination of these. In some implementations, the process 200 is executed in a secure environment, for example, behind a firewall, in secured hardware, or in another type of environment. The example process 200 can include additional or different operations, and the operations may be executed in the order shown or in a different order. In some implementations, one or more operations in the example process 200 can be repeated or executed in an iterative fashion.

At 210, sample values are obtained from one or more entropy sources. The entropy sources can include one or more of the entropy sources 104a-b in FIG. 1, or other types of entropy sources. For example, the sample values can be obtained from user inputs, a ring oscillator, a noisy diode, variances in disk read times, and/or system usages.

A probability model may be obtained or derived for each of the entropy sources. The probability model for an entropy source can be, or it can correspond to, a predetermined set of possible distributions for the entropy source. The distribution for an entropy source indicates, for each possible output value of the entropy source, a probability that the entropy source will produce that output value. The actual distribution of an entropy source may not be known a priori (e.g., it may change over time, or it may be impossible or intractable to completely characterize the actual distribution), and therefore the probability model for an entropy source provides a predetermined set of distributions that could potentially describe the entropy source. As such, a predetermined set of distributions for an entropy source can be determined from a probability model for the entropy source or from other types of information.

An example theoretical framework is provided as follows. A probability space $\Pi$ and a sample space $X$ are sets. In cryptological contexts, $X$ is usually finite but $\Pi$ is often uncountably infinite. The sample space $X$ can be assumed to be finite. An element $p \in \Pi$ can be a distribution. An element of $x \in X$ can be a sample. A probability function for $\Pi$ and $X$ can be a function $$P: \Pi \times X \to [0,1] : (p,x) \to P_p(x)$$

such that for all $p \in \Pi$, the following sum holds $$\sum_{x \in X}^{n} P_p(x) = 1.$$

A probability model can be denoted by a triple $(\Pi, X, P)$, where $\Pi$ is a probability space, $X$ is a sample space, and $P$ is a probability function. In other words, assessing the cryptographic entropy of a source that produces sample values in a finite set $X$, called the sample space, may in some instances rely on an assumption that the source has distributions that belong to some set $\Pi$, called the probability space. For an assessment, this assumed probability model can be made explicit. The notation $P_p(x)$ can be used to denote $P(p,x)$.

At 220, a typicality for each sample value obtained from the entropy source is determined. The typicality of the obtained sample values can be determined for each of the distributions in the predetermined set of distributions. For example, the typicality of the sample values can be determined for some or all of the distributions in a selected probability model. In some instances, the typicality for a given sample value indicates a probability that a randomly-selected sample value from the entropy source system is at most as probable as the given sample value. In some implementations at 220, a likelihood for each sample value is determined. The likelihood of some or all of the obtained sample values can be determined for each of the distributions in the predetermined set of distributions.

At 230, a grading is determined for each of a preselected distributions based on the typicalities. In some implementations, the values of the typicality are used for the grading. In some implementations, the values of the likelihood are used for the grading. The grading may be determined based on a combination of the typicalities, the likelihoods, or other values derived from the sample values and the distributions. At 240, a subset of the distributions is selected, or inferred, based on the grading. The selection process may include choosing one or more distributions that have a maximum grading, or that have a grading above a specified minimum threshold. As such, the selected subset of distributions may include a single distribution, or the selected subset of distributions may include multiple distributions.

Operations 220, 230, and 240 may be described in the example theoretical framework as follows. A maximally graded technique may be used to select the subset of the distributions. Suppose that g is a general grading on probability model $(\Pi, X, P)$, associated with a grading-valued inference function $i_g$. The maximally graded inference associated with grading g can be described as a set-valued inference $i_{max\ g}$ function as follows:

$$i_{max\ g}(x) = \{p : g(x,q) \le g(x,p) \forall q \in \Pi\}$$

The function $i_{max\ g}$ can be considered as derived from g or from $i_g$. In some cases g is discontinuous and such a maximum p may not exist. In these cases, an alternative may sometimes be available. Consider the supremum of gradings values at x, written $s_x = \sup_{p \in \Pi} g(x,p)$. Define $S_\epsilon = \{p: g(x,p) \ge s_x - \epsilon\} \subseteq \Pi$, which are nested according to the size $\epsilon$. As a matter of convenience, $\overline{S}_\epsilon$ can be the closure of $S_\epsilon$ in some natural topology on $\Pi$. If we define $i_{supg}(x) = \cap_{\epsilon > 0} \overline{S}_\epsilon$ is non-empty (which is true if $\Pi$ is given a compact topology), $i_{supg}(x)$ may serve as a suitable substitute for an empty set $i_{maxg}(x)$, even if values of $g(x,p) < s_x$ for $p \in i_{supg}(x)$.

In cryptographic applications, entropy parameters may be of more interest than the distributions themselves. If the parameters are continuous then the definition for $i_{supg}(x)$ above will provide the desired answer for the parameters. For discontinuous parameters the parameters on the $i_{supg}(x)$ may not be what is desired. In this case, instead of considering $i_{supg}(x)$ as the intersection of the chain of sets of $\overline{S}_\epsilon$, $i_{supg}(x)$ can be considered as the limit of the chain of sets $S_\epsilon$. This enables us to consider limits of parameters on $S_\epsilon$, which may differ the value of parameters on the intersection. In many cases, the inferred set $i_{max\,g}(x)$ is a single element (singleton) set. In these cases, the inference is much like a point-valued inference function. However, there are often some values of x for which several, possibly infinitely many, different distributions p attain the maximal value. If G is a general grading method or $I_G$ is grading-valued inference method, then it is possible to derive a set-valued inference method $I_{maxG}$ using the inference functions above. Maximally graded inferences can be model-dependent in the sense that the equation for $i_{max\,g}(X)$ include Π. A potential consequence of this model-dependence is that the maximally graded inference in restriction (Θ, X, P) of the model (Π, X, P), may not have a given relation with the maximally graded inference in the model (Π, X, P).

A threshold graded technique or confidence levels may be used to select the subset of the distributions. Suppose that g is a general grading on a model (Π, X, P). Let t∈[0, 1] and call this value the threshold level. The threshold graded inference function $i_{g>t}$ is a set-valued inference function given by $$i_{g>t}(x)=\{p:g(x,p)>t\}$$

If t>u, then $i_{g>t}(x) \subseteq i_{g>u}(x)$, so the sets obtained are shrinking or stable in size as a function of the threshold. A high threshold may lead to a narrow, perhaps even empty, inference, while a low threshold may lead to a broad inference.

The value c=1−t may sometimes be called the confidence level of the inference. As confidence increases, the breadth of the inference may increase (or stay stable). This reflects the notion that as we can generally make the sacrifice of broadening our inference set in order to gain a more confident inference. In some instances, gradings can be best thresholded when the distribution of the grading, for fixed p and varying x, has some resemblance to the uniform distribution on [0, 1], because the confidence level has a better meaning. Some gradings have such a property and others do not. Threshold graded inferences are not model-dependent provided that the grading is not model-dependent. In particular, if $i_\Theta(x)$ is the threshold graded inference in restriction (Θ, X, P) of the model (Π, X, P), and $i_\Pi(x)$ is the threshold graded inference in the model (Π, X, P), then $$i_\Theta(x)=\Theta \cap i_\Theta(x).$$

When using such a threshold graded inference and taking the infima of parameters, then restriction of the of model cannot decrease the inferred parameter, and relaxing model cannot increase the inferred parameter. In some instances, it may be presumed that an adversary can influence the choice of p in Π. If an adversary has such power over p, then a maximally graded inference may have less value. For appropriate gradings, a high-confidence threshold grading would still have some value.

The grading may be generated by any appropriate technique. The likelihood grading $g_L$ can be described as $$g_L(x,p)=P_p(x).$$

An associated inference function can be written as $L_x=i_{g_L}(x)$. Therefore $L_x(p)=P_p(x)$.

The term likelihood can indicate that $L_x$ may have different properties than a probability function has. For example summing (or integrating) the values of $L_x$ over all probability distributions is not guaranteed to yield 1. Likelihood is a well-known and fundamental notion in statistical inference.

The grading may be generated based on typicality. For a given inclusivity level k∈[0, 1], a typicality grading $g_k$ can be written:

$$g_k(x, p) = \left( \sum_{y:P_p(y)<P_p(x)} P_p(y) \right) + k \left( \sum_{y:P_p(y)=P_p(x)} P_p(y) \right)$$

In some examples, the values k∈{0,/1;2, 1} give rise to exclusive, balanced and inclusive typicality, respectively. Additional or different values of k may be used. Inclusive typicality $g_1(x,p)$ may preprepent the probability that a random sample y is at most as probably as x. Exclusive typicality $g_0(x,p)$ can represent the probability that a random sample y is less probable than x. Balanced typicality is the average of inclusive and exclusive typicality. In other words, balanced typicality is half-way between inclusive and exclusive.

Typicality, unlike likelihood, when used for inference, attempts to capture the notion of how a sample compares in probability to other samples under the same probability distribution. For a fixed distribution p, ranking sample values x by typicality or likelihood gives the same ranking. For fixed x, and varying p, the rankings induced by typicality may differ from those by likelihood. When p is a uniform distribution on X, then typicality is constant for all x, and takes on the value k, the inclusivity. When p is an almost uniform distribution on X, then for the most probable x, it takes value approximately $1-(1-k)/|X|$. For k<1, this will be larger than the typicality at the uniform distribution. When p is subuniform on X, then $$g_k(x, p) = \begin{cases} k & \text{if } P_p(x) > 0 \\ 0 & \text{if } P_p(x) = 0 \end{cases}$$

As such, in models that admit subuniform distributions, any inference based on typicality may treat them equally. Some models may admit distributions with higher typicality than all subuniform distributions, in which case some useful inferences can be made. In some cases, sample statistics may serve as tiebreakers between subuniform distributions. In the formulation above, inclusive typicality is at least as large as likelihood:

$$g_1(x,p) \geq g_L(x,p)$$

but balanced and inclusive typicality could be less. Similarly, $1-g_0(x,p) \geq g_L(x,p)$. The gap between exclusive and inclusive typicality can be at least the likelihood, $$g_1(x,p)-g_0(x,p) \geq g_L(x,p)$$

The notion of typicality is based on well-known notions in statistics of significance level, p-value (also known as percentile or quantile, depending on the units) and cumulative probability function. The general notion of significance level refers to a value of the p-value. The general notion of p-value is a sample statistic that takes uniform distribution on [0, 1], at least under the null hypothesis. A p-value statistic may be formed for continuous distributions by taking a cumulative probability function with respect to some function $f$ on the sample space. Any choice function $f$ can yield a p-value. So, the p-value of x is the probability that f(y)≥f(x), for y drawn from the same distribution. A common use of p-values is when the distribution is a normal distribution and the function f is the identity, then p-value is related to the Gauss error function. In cryptographic applications, distribution are typically discrete, so achieving a proper p-value uniformly distributed in [0, 1] cannot always be strictly done. Nevertheless such a distribution can be used. In cryptographic applications, the parameters of interest, entropy and so on, depend primarily on the distribution, not on specific structure in x. Typicality can be the cumulative probability with respect to the probability function.

Typicality can rank the sample space by probability. Such ranking is often implicit in rankings of popularity, such as music sales charts, election results, and lists of popular names. The game show Family Feud involves such a ranking. For an almost uniform distribution (with no equal probabilities), the distribution typicality is almost uniformly distributed in [0, 1], much like a p-value. Randomized typicality $g_?(x,p)$ is a random variable defined with the same equation as typicality above, except that variable k is selected uniformly at random from the interval [0, 1]. If distribution p is fixed, and x has the probability distribution given by p, then $g_?(x,p)$ is uniformly distributed in [0, 1]. The notion of typicality may adapt the notion of significance level towards the task of assessing min-entropy, in that it ranks the samples according to their probabilities.

At 250, entropy is calculated. The calculated entropy can represent, and can be used as, an assessment of the entropy of the entropy source from which the sample values were obtained. The entropy can be calculated based on the selected subset of distributions, the sample values from the entropy sources, or any suitable combination of these and other information. The entropy can be calculated based on additional or different factors (e.g., information available to an adversary, etc.). Calculating the entropy can include identifying side channel information and computational resources available to an adversary. The entropy calculation can include determining, for each distribution in the selected subset of distributions, a logarithm of a maximal probability of the adversary guessing the cryptographic secret using both the side channel information and the resources available to the adversary. The minimal value, over all of the distributions, of the logarithm can then be identified as the entropy. Additional or different techniques may be used.

Any appropriate entropy measure may be used. For example, the min-entropy, the Shannon entropy, the Renyi entropy, the working entropy, the contingent applied working entropy, or any suitable combination or variation thereof may be used to calculate entropy. The entropy can be expressed in units of bits, or in other units. Min-entropy for a distribution p may be expressed, for example, as $$H_\infty(p) = -\log_2 \max_x P_p(x) = \min_x(-\log_2 P_p(x)).$$

Renyi entropy at order t for the distribution p may be expressed, for example, as $$H_t(p) = \frac{1}{1-t}\log_2 \sum_{x \in X} P_p^t(x).$$

As $t \to 1$, Renyi entropy approaches Shannon entropy. As $t \to \infty$, Renyi entropy approaches min-entropy.

Working entropy may be expressed, for example, as $$H_{(w)}(p) = \min_{x_j}(-\log_2 \Sigma_{j=1}^{[2^w]} P_p(x_j)),$$

where the minimum is taken over arbitrary sequences $x_j$ of distinct values. As a convention let $P_p(x) = 0$ if x is not an element of X, which allows the sum to be well defined for all w. The variable w is the workload and can be measured in bits. Min-entropy is the working entropy at workload of zero bits.

In some implementations, the example process 200 may also include determining whether the entropy source system has adequate entropy to achieve a specified security level in the cryptography system. The example process 200 can modify the entropy source system if it is determined that the entropy source system provides inadequate entropy. In some instances, the entropy source system may be modified by increasing the number of entropy sources. For example, a computing system may have access to multiple entropy sources (e.g., mouse movements, variances in disk read time, system process usages, etc.), and one or more of the entropy sources may be accessed or used as needed or as appropriate. In some instances, the entropy source system may be modified by increasing the size of the output produced by the entropy source system. For example, the acquisition time or the output rate (or both) of a chronological entropy source may be increased as needed or as appropriate.

The following provides an example implementation of the process 200 in the context of a particular example probability model that can be used for a broad class of entropy sources: chronological sources. Chronological sources can generate elements of a sample vector in a chronological fashion for each instantiation. In some cases, chronological sources can be run for varying amounts of time. The analyzed example model for these sources is the Markov model for each instantiation, or more generally, the common power of the Markov model when considering multiple instantiations of the source. Assessment may be performed based on additional or different types of models. The total assessment of entropy can be taken as the minimum assessment over all the hypothesized models, including the example model provided. In the example model, it may be advantageous to compute gradings induced from a sample statistic. Two example sample statistics are described in more detail below: the identity sample statistic and the Markov frequency statistic. In the latter case, the induced probabilities may be computed using the Goulden-Jackson formula.

An example probability model for a chronological source of entropy is provided as follows. A chronological source of entropy generates samples in the form of a sequence $(x_0, \ldots, x_{m-1})$, where each entry in the sequence is a bit string of some length t. The real amount of time that the chronological entropy source needs to run in order to produce a sequence of length m may vary. In the example probability model, the entropy of a chronological source can be assessed as a function of m. If, in practice, the source can be used by running it for a fixed amount of time, and thereby obtained a variable m, then a model accounting for this can be formulated. In this fixed time model, the values for m each have different probability. Such a model may have benefits. In some example models if amount of time, or power, needed to produce the sample sequence of length m is likely to be revealed to an adversary in some form of side channel, then this fact may be accounted for by assessing the contingent entropy.

Therefore, in the example probability model, the probability space is $X = \{0, 1\}^{tm}$. The example model is a Markov model, with each element in the sample sequence depending only on the previous element. This is the Markov model of length m and width 2t. Elements of X can be represented in the form $(x_0, \ldots, x_{m-1})$, with each $x_i \in \{0, 1\}^t$. The elements of $x_i$ are regarded to have been produced by the source in chronological order, but the individual t bits within each $x_i$ are not deemed to have any chronological order. In the example model, the values of $x_i$ can be treated arbitrarily. The probability space includes a pair: a real vector v of dimension $2^t$ and a real square matrix of dimensions $(2^t) \times (2^t)$. The indices of v and M may be represented by bit strings of length t, or equivalently as integers ranging from 0 to $2^t - 1$ inclusive. The probability function can be given by:

$$P_{v,M}(x_0, \ldots, x_{m-1}) = v_{x_0} \prod_{i=1}^{m-1} M_{x_{i-1}, x_i}$$

The distributions $(v, M) \in \Pi$ can meet that conditions that $v_x \geq 0$ and $$\sum_x v_x = 1$$

$$\sum_x M_{y,x} = 1$$

with the latter holding over all valid indices y.

The example probability model may, in some instances, further assume that instantiations of the source are identically and independently distributed. These further assumptions may mean that inferences based on observations of one or more instantiations are applicable to other instantatiations of the source. This results in a model with a larger sample space, as is a common power of the Markov model. Considering k instantiations results in a model with a sample space $X = \{0, 1\}^{tmk}$. The probability space is the same. Elements of the larger sample space can be represented as sequences of sequence of bit strings. However, the outer sequence of length k represents the instantiations, and is not chronological. The inner sequences represent the chronological outputs from each instantiation. Each individual output includes t bits, which the example model treats arbitrarily. The probability function for the larger model can be:

$$P_{v,M}[(x_{0,0}, x_{0,1} \ldots, x_{0,m-1}), \ldots, (x_{k-1,0}, \ldots, x_{k-1,m-1})] = \prod_{j=0}^{k-1} v_{x_{j,0}} \prod_{i=1}^{m-1} M_{x_{j,i-1}, x_{j,i}}$$

In practice, a key might be generated from a relatively short subsequence of the output from a single instantiation of the source. During prospective assessment, observations from multiple instantiations of the source may be possible, which may permit a stronger inference than observation of a single source. Nevertheless, even if only a single instantiation is observed during prospective assessment, the assumed larger probability model means that the inference applies to other instantiations of the source.

Formal inference in the example Markov model with parameters such that $2^t \gg (km)^2$ in which the source being assessed may essentially produce completely uniformly and independently distributed bit strings of length t as the elements is very likely to give an inference of zero entropy, whereas the total entropy (over all k instantiations and all bits produced) may actually be tmn bits. This discrepancy between the inferred and actual entropy may arise due to the relatively low sample size. With so few observations of the t-bit elements, they could be all be distinct and a formal inference method would not exclude the possibility that Markov model distribution is a deterministic distribution. To adapt to such a setting, formal inference may be by observing that the t-bit values obtained from the source may have some structure. A chronological source has elements representing successive t-bit measurements of some real quantity, such as time, or perhaps the resistance across some noisy diode. In some cases, the numerical differences between successive measurements may be small enough such that repetitions are likely, even though the differences are still t-bit quantities. So, this means applying a transformation on the sample values, which for k=1, looks like:

$$(x_0, \ldots, x_{m-1}) \rightarrow (x_0, x_1 - x_0, \ldots, x_{m-1} - x_{m-2})$$

The differences can be computed mod $2^t$. This transformation is reversible, so it does not lose, or gain, any actual entropy. If most of the absolute value of the differences are bounded by $2^r$, and $2^r \ll (km)^2$, then there can be repetitions among the sequences. In this case, it may make sense to model the subsequence $(x_1 - x_0, \ldots, x_{m-1} - x_{m-2})$ with the example Markov model. The simple transformation has the effect of making visible to the formal inference methods the underlying mechanism of the source. If the differences vary sufficiently to be inconsistent with any deterministic Markov distribution, then the formal inference methods can infer non-zero entropy. The effect of the transformation has been to change the model on the original samples.

Note that this transformation has not modified the actual entropy but has boosted the assessed entropy. The possibility of such boosts warrant caution. In particular, one may not want to apply some arbitrary transformation (to the model) which might artificially, and excessively, boost the entropy assessment. To avoid this, assessment may be based on simple transformations. In particular, the transformation of the model may not be based on the sample. The initial term $x_0$ contributes to actual entropy, but was excluded from the transformed Markov model, because it was not a difference of elements, so it cannot be expected to have the same role in the transition matrix. Furthermore, formally assessing a nonzero entropy for $x_0$ is only likely for $k^2 \gg 2^t$. In this case, $x_0$ could be assessed using the independent model.

In prospective assessment, the type of entropy assessed can be a contingent applied working entropy. The contingent applied working entropy can be based on a probability model $(\Pi, X, P)$. A leakage function $g: X \rightarrow Z$ can be used. If the source issues sample x, then the adversary will learn g(x). An application function $f: X \rightarrow Y$ can be used. (The application function can be chosen such that it does not include any cryptographic functions, but it should include any other functions applied to the source samples.) A workload value w, in bits, measuring the cryptographic capabilities of an adversary can be selected. The contingent applied working entropy of distribution $p \in \Pi$ can be given by:

$$H_{f((w))|g}(p) = -\log_2 \sum_{z \in Z} \max_{W \in Y: |W| = \lfloor 2^w \rfloor} \sum_{y \in W} \sum_{x \in f^{-1}(y) \cap g^{-1}(z)} P_p(x)$$

For default choices of the parameters, the leakage function g may be set to a constant function, meaning no leakage, and the workload may be set to 0. Different leakage functions an workload values may be used, as appropriate. The application function can reflect how the sample actually contributes to the seed. In assessing retrospective entropy, it should be possible to use eventuated entropy.

A sample statistic is a function $x: X \rightarrow S$, from the sample space to a statistic space. A sample statistic induces from a model $(\Pi, X, P)$ another model $(\Pi, S, Q)$ such that $Q_p(y) = \sum_{x: s(x) = y} P_p(x)$. It is possible to make inferences about $\Pi$, as though one was making inferences in the induced model. That is given observation x, look at s(x) and make inference for the value of the distribution p characterizing assuming the induced model. The identity function can be regarded as a sample statistic.

The two example sample statistics for the smaller, single-instantiation example model, the Markov model of width $2^t$ and length m are the identity function and the Markov frequency statistic F, can be $F(x)=(e(x), U(x))$, where $e(x)=e_{x_0}$ is a $2^t$ dimensional vector all of whose entries are zero except for the entry in position $x_0$ whose value is 1 (vector entry indices run from 0 to m−1); and U(x) is an $2^t \times 2^t$ matrix with non-negative integer entries $U_{y,z}$ indexed by integers pair (y, z) such that $0 \le y, z \le 2^t$ with $$U_{y,z}=|\{i | 1 \le i \le N-1, x_{i-1}=y, x_i=z\}|$$

An example sample statistic F for the larger, multiply instantiated Markov model, with k instantiations can be:

$$F(x^0, \ldots, x^{k-1}) = \sum_{j=0}^{k-1} F(x^j)$$

where the $x^j$ are sequences of length m (with entries of t-bit strings). Each F term in the sum is a pair of a vector and a matrix, and in the sum, the vectors are added, and the matrices are added. In some implementations, any sample statistic on the given model may be used, for example, if the sample statistic is model-neutral with respect to the probability model. In some implementations, sample statistics that are not model-neutral are not be used. In some implementations, sample statistics that are selected in a manner dependent on observed samples are not used.

In some implementations, a grading can include a real-valued function on the probability space, $g: \Pi \to \mathbb{R}$. The set of gradings may be referred to as $\Gamma(\Pi)$. A grading-valued inference function is function $i: X \to \Gamma(\Pi)$, which may also be thought of as function $i: X \times \Pi \to \mathbb{R}$. When clear from context, a grading-valued inference function can just be called a grading. The notation $i_x(p)$ can be used to indicate $i(x,p)$ (which indicates $i(x)(p)$).

A set-valued inference function i can be a grading-valued inference function i in which $i_x(p) \in \{0, 1\}$ for all $(x,p) \in X \times P$, and one may identify $i_x$ with $i_x^{-1}(p)=\{p \in \Pi: i_x(p)=1\}$, so that i maps X to subsets of $\Pi$. A set-valued inference i is a graded inference if it is derived from another grading-valued inference j in one of two ways. Graded inference i is maximally graded if $$i(x)=\{p: j_x(p) \ge j_x(q), \forall q \in \Pi\}.$$

It may be noted as $i=\hat{j}$. Graded inference i is threshold graded with threshold t if $$i(x)=\{p: j_x(p) \ge t\}$$

It may be noted as $i=j^{\ge t}$. Set-valued inferences can be graded inferences, and can be derived from real grading valued inferences. An example graded inference is the threshold graded. An example threshold level is $2^{-40}$.

Four gradings from which graded inference can be derived are provided as follows. The likelihood grading is given by $L_x(p)=P_p(x)$. The likelihood grading may not be threshold graded. The inclusive typicality grading can be given by $$T_x(P) = \sum_{y \in X: P_p(y) \le P_p(x)} P_p(y)$$

The balanced typicality grading can given by $$B_x(P) = \left( \sum_{y \in X: P_p(y) < P_p(x)} P_p(y) \right) + \frac{1}{2} \left( \sum_{y \in X: P_p(y) = P_p(x)} P_p(y) \right)$$

Balanced typicality is an example real grading. The adjusted likelihood grading can be given by $$A_x(p) = \frac{1}{2}\left(1 + P_p(x) - \sum_y P_p(y)^2\right)$$

In some cases, the adjusted likelihood grading is not threshold graded. Therefore the allowed set-valued gradings can be $\hat{L}$, $\hat{T}$, $\hat{P}$, $\hat{A}$ and $T^{\ge t}$ and $B^{\ge t}$. An example set-valued grading is $B^{2-40}$.

For example, assessment of entropy, given observation x, can be based on a set-valued inference i for the distribution. The assessed entropy can be calculated as $$H(x)=\inf\{H_{f((w))|g}(p):p \in i(x)\}.$$

Additional or different entropy models may be used. When assessment is made using multiple methods, such as by different gradings, different sample statistics, and even different probability models, the assessed entropy can be taken as the minimum of all the assessments.

In the example model, with the example inference function, there can be assessment for the two default sample statistics. The assessment entropy can at most the minimum of these two assessments. An assessment of entropy may include this default assessment.

The operations described in this specification can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computing device or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computing device. Generally, a processor will receive instructions and data from a read-only memory or a random access memory or both. The essential elements of a computing device are a processor for performing actions in accordance with instructions and one or more memory devices for storing instructions and data. Generally, a computing device will also include, or be operatively coupled to receive data from or transfer data to, or both, one or more storage devices for storing data. However, a computing device need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, subject matter described in this specification can be implemented on a computer having a display device, e.g., an LCD (liquid crystal display) screen for displaying information to the user and a keyboard and a pointing device, e.g., touch screen, stylus, mouse, etc. by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computing device can interact with a user by sending documents to and receiving documents from a device that is used by the user; for example, by sending web pages to a web browser on a user's client device in response to requests received from the web browser.

Some of the subject matter described in this specification can be implemented in a computing system that includes a back-end component, e.g., as a data server, or that includes a middleware component, e.g., an application server, or that includes a front-end component, e.g., a client computing device having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a data network.

The computing system can include clients and servers. A client and server are generally remote from each other and typically interact through a data network. The relationship of client and server arises by virtue of computer programs running on the respective computers and having a client-server relationship to each other. In some implementations, a server transmits data to a client device. Data generated at the client device can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In a general aspect, entropy is evaluated in a cryptography system. Entropy may be evaluated, for example, in connection with manufacturing a cryptographic apparatus that includes or utilizes an entropy source, in connection with deploying or testing a cryptography system, during use of a cryptography system, or in other instances. In some cases, the entropy of an entropy source is evaluated by calculating a quantitative measure of entropy. Additionally or alternatively, entropy may be evaluated qualitatively, for example, by determining whether the entropy provided by an entropy source is sufficient to achieve a specified level of security in the cryptography system.

In some aspects, sample values are produced by an entropy source system. A typicality is determined for each of the sample values. A grading is determined for preselected distributions based on the typicalities of the sample values. A subset of the preselected distributions are selected based on the gradings. An entropy of the entropy source system is calculated based on the subset of the plurality of distributions.

These and other aspects may include one or more of the following features. Whether the entropy source system has adequate entropy to achieve a specified security level in the cryptography system is determined. The entropy source system is modified based on a determination that the entropy source system has inadequate entropy. The typicality for a given sample value indicates a probability that a randomly-selected sample value from the entropy source system is at most as probable as the given sample value. A pseudorandom number generator is seeded based on a sample value produced by the entropy source system. A cryptographic secret is obtained based on an output of the seeded pseudorandom number generator.

Additionally or alternatively, these and other aspects may include one or more of the following features. A likelihood for each of the sample values is determined. The gradings are determined based on the typicalities of the sample values and the likelihoods of the sample values. Selecting a subset of the distributions based on the gradings includes selecting one or more distributions having a maximum grading, selecting one or more distributions having a grading above a specified threshold grading, or any suitable combination of these. Calculating the entropy includes identifying side channel information and computational resources available to an adversary. Calculating the entropy includes determining, for each of the subset of distributions, a logarithm of a maximal probability of the adversary guessing the cryptographic secret using the side channel information and the resources available to the adversary. Calculating the entropy includes identifying as the entropy the minimal value of the logarithm determined for the subset of distributions.

Thus, implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for assessing entropy in a cryptography system, the method comprising:
   obtaining a sample value produced by an entropy source system;
   determining a typicality grading for each of a preselected plurality of probability distributions, the typicality gradings providing a comparison among the plurality of probability distributions, the typicality grading for each individual probability distribution being determined based on the cumulative probability of values that are, according to that individual probability distribution, less probable than the sample value;
   wherein the typicality grading $g_k(x,p)$ for each individual probability distribution is determined according to:

$$g_k(x, p) = \left(\sum_{y: P_p(y) < P_p(x)} P_p(y)\right) + k\left(\sum_{y: P_p(y) = P_p(x)} P_p(y)\right),$$

where $k \in [0,1]$ represents an inclusivity level between zero and one inclusive, $P_p(x)$ represents the probability of the sample value x according to the individual probability distribution p, and $y: P_p(y) < P_p(x)$ represents the values that are less probable than the sample value;
   selecting a subset of the plurality of probability distributions based on the typicality gradings; and
   calculating an entropy of the entropy source system based on the subset of the plurality of probability distributions.

2. The method of claim 1, wherein determining the typicality grading for an individual probability distribution comprises determining a typicality of the sample value for that individual probability distribution.

3. The method of claim 2, wherein the typicality of the sample value indicates a probability that a randomly-selected value from the entropy source system is at most as probable as the sample value.

4. The method of claim 1, further comprising:
   determining whether the entropy source system has adequate entropy to achieve a specified security level in the cryptography system; and
   modifying the entropy source system based on a determination that the entropy source system has inadequate entropy.

5. The method of claim 1, further comprising:
   seeding a pseudorandom number generator based on a sample value produced by the entropy source system; and
   obtaining a cryptographic secret based on an output of the seeded pseudorandom number generator.

6. The method of claim 1, comprising:
   determining, based on the sample value, a typicality and a likelihood for each of the preselected plurality of probability distributions; and
   computing the typicality gradings based on the typicalities and likelihoods.

7. The method of claim 1, wherein selecting a subset of the plurality of probability distributions based on the typicality gradings includes at least one of:
   selecting one or more probability distributions having a maximum typicality grading; or
   selecting one or more probability distributions having a typicality grading above a specified threshold typicality grading.

8. The method of claim 1, wherein calculating the entropy includes:
   identifying side channel information and computational resources available to an adversary;
   determining, for each probability distribution in the subset of probability distributions, a logarithm of a maximal probability of the adversary guessing the cryptographic secret using the side channel information and the resources available to the adversary; and
   identifying as the entropy the minimal value of the logarithm determined for the subset of probability distributions.

9. A method for assessing entropy in a cryptography system, the method comprising:
   obtaining a sample value produced by an entropy source system;
   determining a typicality grading for each of a preselected plurality of probability distributions, the typicality gradings providing a comparison among the plurality of probability distributions, the typicality grading for each individual probability distribution being determined based on the cumulative probability of values that are, according to that individual probability distribution, less probable than the sample value;
   wherein the cumulative probability of values that are less probable than the sample value comprises the sum:

$$\left(\sum_{y: P_p(y) < P_p(x)} P_p(y)\right),$$

where $P_p(x)$ represents the probability of the sample value x according to the individual probability distribution p, and $y: P_p(y) < P_p(x)$ represents the values that are less probable than the sample value;

selecting a subset of the plurality of probability distributions based on the typicality gradings; and calculating an entropy of the entropy source system based on the subset of the plurality of probability distributions.

10. The method of claim 9, wherein determining the typicality grading for an individual probability distribution comprises determining a typicality of the sample value for that individual probability distribution.

11. The method of claim 10, wherein the typicality of the sample value indicates a probability that a randomly-selected value from the entropy source system is at most as probable as the sample value.

12. The method of claim 9, further comprising:
determining whether the entropy source system has adequate entropy to achieve a specified security level in the cryptography system; and
modifying the entropy source system based on a determination that the entropy source system has inadequate entropy.

13. The method of claim 9, further comprising:
seeding a pseudorandom number generator based on a sample value produced by the entropy source system; and
obtaining a cryptographic secret based on an output of the seeded pseudorandom number generator.

14. The method of claim 9, comprising;
determining, based on the sample value, a typicality and a likelihood for each of the preselected plurality of probability distributions; and
computing the typicality gradings based on the typicalities and likelihoods.

15. The method of claim 9, wherein selecting a subset of the plurality of probability distributions based on the typicality gradings includes at least one of:
selecting one or more probability distributions having a maximum typicality grading; or
selecting one or more probability distributions having a typicality grading above a specified threshold typicality grading.

16. The method of claim 9, wherein calculating the entropy includes:
identifying side channel information and computational resources available to an adversary;
determining, for each probability distribution in the subset of probability distributions, a logarithm of a maximal probability of the adversary guessing the cryptographic secret using the side channel information and the resources available to the adversary; and
identifying as the entropy the minimal value of the logarithm determined for the subset of probability distributions.

* * * * *

UNITED STATES PATENT AND TRADEMARK OFFICE
CERTIFICATE OF CORRECTION

| | | |
|---|---|---|
| PATENT NO. | : 8,787,564 B2 | Page 1 of 1 |
| APPLICATION NO. | : 13/307078 | |
| DATED | : July 22, 2014 | |
| INVENTOR(S) | : Daniel Richard L. Brown | |

It is certified that error appears in the above-identified patent and that said Letters Patent is hereby corrected as shown below:

In the Claims

Column 26, Line 1, In Claim 14, delete "comprising;" and insert -- comprising: --, therefor.

Signed and Sealed this
Sixteenth Day of December, 2014

Michelle K. Lee
*Deputy Director of the United States Patent and Trademark Office*